US 6,615,613 B1

(12) United States Patent
Iwabuchi et al.

(10) Patent No.: US 6,615,613 B1
(45) Date of Patent: Sep. 9, 2003

(54) METHOD OF GRINDING A SUBSTRATE AND METHOD OF MANUFACTURING A GLASS SUBSTRATE AND A MAGNETIC RECORDING MEDIUM BY THE USE OF THE GLASS SUBSTRATE

(75) Inventors: Shozo Iwabuchi, Yokohama (JP); Masahiro Katagiri, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 09/676,669

(22) Filed: Oct. 2, 2000

(30) Foreign Application Priority Data

Sep. 30, 1999 (JP) .......................................... 11-280780

(51) Int. Cl.⁷ ............................................... C03C 19/00
(52) U.S. Cl. ............................... 65/61; 451/27; 451/41; 451/43; 451/44; 451/120; 451/121; 451/254; 451/257; 451/532; 451/916
(58) Field of Search ............................... 65/61; 451/27, 451/41, 43, 44, 120, 121, 254, 257, 532, 916

(56) References Cited

U.S. PATENT DOCUMENTS 6,363,599 B1   4/2002   Bajorek

FOREIGN PATENT DOCUMENTS

| JP | 11-28649 | 2/1999 | ............. B24B/9/08 |
| JP | 11-33886 | 2/1999 | ............. B24B/5/06 |

OTHER PUBLICATIONS

The American Heritage Dictionary, Second College Edition, p. 257, the definition of the word, "Chamfer", copyright 1982.*

* cited by examiner

Primary Examiner—Michael Colaianni
(74) Attorney, Agent, or Firm—Sughrue Mion, PLLC

(57) ABSTRACT

In a method of grinding side end surfaces of substrates, spacers are interposed between the substrates to form a stack of the substrates and the spacers. The spacers are slightly smaller in size than the substrates. The stack of the substrates and the spacers are ground by a rotatable brush or pad on the side end surfaces of the substrates so as to smooth chamfered portions of the substrates together with the side end surfaces.

18 Claims, 8 Drawing Sheets

PRIOR ART

METHOD OF GRINDING A SUBSTRATE AND METHOD OF MANUFACTURING A GLASS SUBSTRATE AND A MAGNETIC RECORDING MEDIUM BY THE USE OF THE GLASS SUBSTRATE

BACKGROUND OF THE INVENTION

This invention relates to a method of grinding a side end surface of a substrate, such as a glass substrate for a magnetic recording medium, and, in particular, to the method suitable for grinding an inner peripheral side end surface and an outer peripheral side end surface of the glass substrate. The inner and the outer peripheral side end surfaces might be simply called inner and outer side end surfaces, respectively, hereinafter. In addition, it should be noted throughout the instant specification that the terms "grind", "grinding" and "ground" will be used to process the side end surface and to distinguish the end surface processing from the any other processing, especially, main surface processing, but they should be practically interpreted as the meaning of "polish", "polishing", and "polished", respectively.

In general, an aluminum substrate has been widely used as a magnetic recording medium substrate for a magnetic disk or the like. However, it has been a recent trend that such an aluminum substrate has been gradually replaced by a glass substrate which is excellent in flatness and strength in comparison with the aluminum substrate, as the magnetic disk becomes smaller in size, thinner in thickness, and higher in recording density.

As such a glass substrate for the magnetic recording medium, use has been made of a chemically reinforced glass substrate and a crystallized or devitrified glass substrate reinforced by recrystallization or devitrification.

As the recording density becomes higher, a magnetic head has also been changed from a thin film head to a MR (magneto-resistive) head or a GMR (giant magneto-resistive) head. From this fact, it will be expected that the current of times will be directed to reproducing on the magnetic recording medium of the glass substrate by using the magneto-resistive (MR) head.

Under the circumstances, a wide variety of improvements have been made in the magnetic disk so as to realize a high recording density. With such improvements of the magnetic disk, various new problems have taken place one after another in connection with the glass substrate for the magnetic recording medium (will be simply called a glass substrate hereinafter), also. One of the problems is that a substrate surface of the glass substrate must be kept thoroughly clean. For example, when foreign materials are adhered to the substrate surface, they bring about film defects of films deposited on the substrate surface and/or cause projections to occur on the films. In addition, the projections on the films make it difficult to maintain an appropriate glide height.

On the other hand, when the magneto-resistive (MR) head is used for reproducing from the magnetic recording medium of the glass substrate a flying height of the MR head tends to be lowered to improve a recording density. In this event, it often happens that phenomena take place such that reproduction is disordered or becomes impossible. It has been pointed out that the cause or source of the phenomena reside in projections formed by particles adhered to the substrate surface of the glass substrate. Specifically, the projections on the magnetic recording medium give rise to thermal asperity and bring about a temperature rise on the MR head. Such a temperature rise on the MR head results in varying a resistance value of the MR head and adversely affects electro-magnetic conversion.

Now, it is well known that the glass substrate for the magnetic recording medium is shaped like in a ring and, therefore, has an inner side end surface and an outer side end surface which may be referred to as inner and outer side peripheral surfaces, respectively. In addition, the magnetic recording medium is usually housed in a resin case.

As the source of the foreign materials on the glass substrate, recent attention has been directed to particles that occur due to undulations of the side end surfaces of the glass substrate. Specifically, when the magnetic recording medium with the glass substrate is rotated in the resin case, the outer side end surface of the glass substrate rubs a wall of the resin case on account of the undulations of the outer side end surface of the glass substrate. Such rubbing brings about adhesion of the particles or resin, glass, and the like to the magnetic recording medium. Moreover, any other particles are often adhered to the magnetic recording medium from the inner and the outer side end surfaces of the glass substrate.

Especially, it has been found out by the instant inventors that the inner side end surface of the glass substrate is rough or equivalent in flatness as compared with the outer side end surface and is therefore susceptible to cause undesired particles.

As regards a chemically reinforced glass substrate as mentioned before, chemical reinforcement is carried out by immersing a glass substrate into a chemical reinforcement or strengthening solution that is heated. On immersion, the glass substrate itself is held in a holder (for example, three points holder). Specifically, a plurality of the glass substrates are supported by the holder at support portions of the outer end side surface of the glass substrates. Herein, it is assumed that the outer end side surfaces of the glass substrates are not flat especially at the support portions. In this case, undesired liquid sumps of the chemical reinforcement solution are liable to occur at the support portions when the glass substrates are lifted from the chemical reinforcement solution. Such liquid sumps leave, on the support portions, particles resulting from foreign materials included in the chemical reinforcement solution and finally result in occurrence of the thermal asperity due to the particles.

Conventionally, a method and an apparatus for grinding inner and outer side end surfaces of a glass substrate are disclosed in Japanese Patent Unexamined Publication Nos. H11-33886 (33886/1999) and H11-28649 (28649/1999). In each conventional grinding method, a plurality of glass substrates or glass disks are stacked on a rotatable table and are rotated in a predetermined direction. Grinding is performed by supplying the rotating glass substrates with slurry including an abrasive material and by rotating a grinding brush in a direction reverse relative to the predetermined direction of the glass substrates. Furthermore, the grinding brush is reciprocated in a stacked direction of the glass substrates. Thus, the inner and outer side end surfaces can be ground.

Such grinding the side end surfaces is generally performed with the glass substrates directly stacked together before the glass substrates are chemically reinforced. This shows that un-reinforced or pre-reinforced glass substrates are ground by the grinding brush with a pressure imposed onto the side end surfaces of the glass substrates by the grinding brush. As a result, the pressure of the grinding brush is directly given to the glass substrates stacked one another and often brings about breakage of the glass substrates. In order to avoid the breakage of the glass substrates, the grinding of the side end surfaces (may be called side surface grinding) must be performed when each glass substrate is thick to some extent. Taking this into consideration, the side surface grinding is usually carried out before a final lapping process for lapping or polishing each glass substrate by the use of a carrier including abrasive grains.

Herein, let the final lapping process be carried out after the side surface grinding. In this event, each glass substrate is lapped or rubbed during the final lapping process not only on a main surface thereof but also on the side end surface. This is because the abrasive gains undesirably lap or rub the side surfaces of each glass substrate due to an interference between the abrasive material used in the side surface grinding and the abrasive grains used in the final lapping process.

Since the side end surfaces are once mirror finished by the side surface grinding, the side end surfaces are roughened again by the abrasive grains during the final lapping process and are not polished until completion of an end product. This shows that the end product has the roughened side end surfaces. As a result, the thermal asperity inevitably takes place in the end product manufactured in the manner mentioned above. In addition, such an end product is disadvantageous in that it is weak in transverse rupture strength.

As readily understood from the above, the glass substrates are directly stacked during the side surface grinding without any spacing between two adjacent ones of the glass substrates. However, an unground portion inevitably remains on the side end surfaces of each glass substrate when the above-mentioned method is used. Such an unground portion gives rise to the thermal asperity and weakens the transverse rupture strength.

SUMMARY OF THE INVENTION

It is an object of this invention to provide a method of effectively grinding side end surfaces of each glass substrate without any breakage even when a thickness of each glass substrate is thin.

It is another object of this invention to provide a method of the type described, which can perform a side surface grinding process after a final lapping process.

It is still another object of this invention to provide a method of the type described, wherein an unground portion is not left on the side end surfaces of each glass substrate and subsequently the side end surfaces can be kept thoroughly clean at a low cost.

It is yet another object of this invention to provide a glass substrate for a magnetic recording medium, which has a main surface kept thoroughly clean. It is another object of this invention to provide a recording medium which can ultimately avoid troubles resulting from foreign materials adhered to the main surface.

According to a first aspect of this invention, a method is for use in grinding each side end surface of a plurality of substrates of disk shapes. The method comprises the steps of successively stacking the substrates with an intermediary interposed between two adjacent ones of the substrates and grinding each side surface with the intermediary interposed between the substrates.

With this method, the substrates are spaced apart from one another in a main surface direction with the intermediary interposed between adjacent ones of the substrates. No pressure is imposed on both side end surfaces of the substrates doe to a grinding brush or pad on the side end surface grinding. This shows that no breakage takes place on the side end surfaces of the substrates during the side end surface grinding even when each substrate is thin. Accordingly, each substrate can be ground even when each substrate is kept in a thin state (for example, 0.5 to 1.3 mm) after it is subjected to a lapping process. Even when each substrate can be polished after the side end surface grinding, the side end surface is not roughened because abrasive grains in the polishing process are smaller than those in the side end surface grinding. In addition, the substrates spaced via the intermediary have chamfered portions ground without any remnant portions left unground because such chamfered portions are also ground by the grinding brush or so. Thus, it is possible with this method that the side end surface can be kept in a highly smoothed state at a low cost. This makes is possible to keep such main surface of the substrates highly clean and to strengthen the transverse rupture strength.

During the side end surface grinding, free abrasive grains must be brought into contact with the side end surface. Especially, when the substrate is a glass substrate of a disk shape used for a magnetic recording medium, both inner and outer side end surfaces must contact as the with the abrasive grains. In order to bring both the inner and the outer side end surfaces into contact with the abrasive grains, use may be made of a method of immersing a grinding solution including the abrasive grains or method of directly supplying the grinding solution onto the inner and the outer side end surfaces by spraying the grinding solution or the like. Either one of the above-mentioned methods may be used. The former method may not be considered in connection with a lack of the grinding solution.

At any rate, the above-mentioned grinding method realizes the glass substrate of a surface roughness that can avoid thermal asperity, namely, a surface roughness less than 0.2 $\mu$m and 1.0 $\mu$m when it is represented by Ra and Rmax, respectively, respectively.

According to a second aspect of this invention, a method is for use in processing a plurality of substrates of disk shapes, each of which has a pair of main surfaces and inner and outer side end surfaces contiguous to the main surfaces. The processing method comprises the steps of lapping each main surface of the substrates, polishing each main surface of the substrates, successively stacking the substrates, and grinding at least one of the inner and the outer side end surfaces with the intermediary interposed between the substrates. The side end surfaces of the substrates ground by the side end surface grinding are kept clean during the following process, such as the polishing process. Thus, the method is very effective to keep the side end surfaces and the main surfaces in a highly clean or smooth state.

According to a third aspect of this invention, the substrates are spaced apart from each other through the intermediary which may be a spacer. Such intervention of the spacer serves to certainly prevent breakage of the substrates during the side end surface grinding and to avoid occurrence of remnant portions unground by a grinding brush on chamfered portions of the inner and the outer side end surfaces. The spacer may not be restricted by size and configuration when the adjacent substrates are kept in parallel to each other by the spacer. For example, the spacer may have a ring shape, a bay shape partially cut away from the ring shape, or may be divided into a plurality of small circular spacers without any hole. The size of the spacer may be equal to or slightly smaller than that of each substrate and may not exceed the chamfered portion or portions of each substrate. The thickness of the spacer may be adjusted in accordance with diameters of bristles of the grinding brush and preferably falls within a range between 0.1 and 0.3 mm. The grinding method according to this invention is available for grinding an outer side end surface of a substrate which has no center hole. In this case, it is needless to say that the spacer may have no center hole.

According to a fourth aspect of this invention, the spacer may be formed by a soft material such that breakage of each substrate is not caused to occur due to a pressure resulting from the grinding brush or the grinding pad. Using such a soft material as the spacer makes it possible to grind the side end surfaces of the glass substrates even when each substrate is thin in thickness. This means that the grinding step can be performed after the lapping step and before the polishing step. As a result, the side end surfaces of the substrates ground are not roughened by the polishing step and are kept clean.

For a portable telephone set, a digital camera, a navigation device, and the like, proposals recently have made about a small substrate of 1 inch in diameter less than 2.5 inches. Since such a small substrate is very thin in thickness, it is very important to grind the side end surfaces without breakage and to keep the surface state clean after the side end surfaces.

Although a material of the spacer is not restricted, it is preferable that the spacer may be formed, for example, by polyurethane, acrylic acid resins, plastics, rubber, or the like. For instance, when the spacer is formed by the same material as the grinding pad, it may have the Shoe A hardness between 15° and 90°.

As mentioned before, the side end surface grinding step is preferably performed after the lapping step so as to keep the surface states of each side end surface clean. Specifically, the lapping step is performed by using the abrasive grains more than 0.5 $\mu$m and preferably between 0.5 $\mu$m and 2 $\mu$m while the grinding step is performed by the use of abrasive grains between 1 $\mu$m and 4 $\mu$m so as to avoid the thermal asperity.

According to a sixth aspect of this invention, the grinding step comprises the steps of grinding the inner side end surface of each substrate; and grinding the outer side end surface of each substrate. In this event, either one of the inner and the outer side end surfaces is performed prior to the other. Alternatively, the inner and the outer side end surfaces may be performed simultaneously.

It is preferable that the inner side end surface is ground and thereafter the outer side end surface is ground. This is because the step and an apparatus for grinding the outer side end surface can be utilized on grinding the inner side surface also. More specifically, when the outer side end surface is at first ground prior to the inner side end surface, provision is to be made about both a grinding jig for grinding the outer side end surface and another grinding jig for grinding the inner side end surface. On the other hand, when the inner side end surface is at first ground, a grinding jig for grinding the inner side end surface can also be used as a grinding jig for grinding the outer side end surface.

Furthermore, when both the inner and the outer side end surfaces are simultaneously ground, jigs and apparatus should be improved. However, this method is advantageous in that a cost can be reduced when a comparatively small number of the substrates are ground.

When the inner side end surface is ground after the outer side end surface is ground, a contact force or pressure imposed on the glass substrate from the grinding brush or pad becomes small on the inner end surface grinding as compared with the outer side end surface grinding. Therefore, this method is effective to avoid breakage of the substrates on the inner side end surface grinding and to prevent a reduction of a yield due to the breakage.

According to a seventh aspect of this invention, the inner side end surface grinding step is performed at a pressure which is imposed by a grinding brush or a grinding pad onto the inner side end surface of each substrate and which is less than a pressure imposed during the outer side end surface grinding step. Such a reduction of the pressure imposed on the inner side end surface grinding step can avoid fluctuation of an axis of the grinding brush or pad used for the inner side end surface grinding step. Accordingly, the inner side end surface can be machined at a high precision in configuration and state. Specifically, the pressure of the grinding brush or pad imposed onto the glass substrates falls within a range between 0.05 and 0.3 MPa in the inner side end surface step while it falls within a range between 0.05 and 0.5 MPa in the outer side end surface.

According to an eighth aspect of this invention, the inner side end surface grinding step is performed by a grinding brush which has bristles having diameters smaller than those of bristles of a grinding brush used in the outer side end surface grinding step. Using such grinding brushes is effective to further improve the surface state. The diameters of the bristles of the brushes may be selected between 0.05 mm and 1.0 mm in consideration of a length of the chamfered portion. Specifically, when the glass substrate has a thickness of 0.9 mm and the length of the chamfered portion of 0.28 mm, the diameters of the bristles of the grinding brush for grinding the outer side end surface fall within a range between 0.08 and 0.3 mm (preferably, 0.2 and 0.3 mm) while the diameters of the bristles of the grinding brush for the inner side end surface fall within a range between 0.08 and 0.3 mm (preferably, 0.1 and 0.3 mm).

On the other hand, when the grinding pad is used, a hardness of the pad is adjusted. Specifically, the grinding pad for the outer side end surface may have a Shoe A hardness between 50° and 90° while the grinding pad for the inner side end surface may have the Shoe A hardness between 25° and 90°.

It is needless to say that the diameters of the bristles for the inner and the outer side end surfaces may be optionally determined in view of another aspect different from the eighth aspect.

According to a ninth aspect of this invention, a method is for use in manufacturing a glass substrate for a magnetic recording medium and comprises the step of grinding the inner and/or the outer side end surfaces. The glass substrate has a surface kept highly clean and an excellent transverse rupture strength.

According to the tenth aspect of this invention, the magnetic recording medium is structured by the glass substrate which is excellent in cleanliness and transverse rupture strength. In the magnetic recording medium, it is possible to reduce defects on each layer deposited on the glass substrate and to lower a glide height because the glass substrate has no foreign materials attached onto the side end surfaces thereof.

According to an eleventh aspect of this invention, the magnetic recording medium is used for an MR head or a GMR head and can avoid malfunction resulting from the thermal asperity and wrong reproduction.

According to a twelfth aspect of this invention, the magnetic recording medium has a magnetic layer comprising Co and Pt. The magnetic recording medium mentioned before has excellent magnetic characteristics.

According to a thirteenth aspect of this invention, a glass substrate is for use in a magnetic recording medium and has a pair of main surfaces and inner and outer side end surfaces each of which is contiguous to the main surfaces and which have inner and outer side end surface portions. The outer side end portion is ground together with the inner side end portion and has a surface roughness smaller than the inner side end portion. Each of the inner and the outer side end portions is contiguous to the main surfaces through a chamfered portion between the side end surface portion and each main surface. Each chamfered portion is also ground. According to a fourteenth aspect of this invention, each of the inner and the outer side end portions has a surface roughness Rmax not greater than 1 μm. With this structure, the glass substrate is subjected to side end surface grinding and is thereafter chemically reinforced. Such a chemical reinforced glass substrate can avoid occurrence of liquid sumps of chemical reinforcement solution at support portions to be supported by a holder. Therefore, it is possible to prevent occurrence of the thermal asperity due to foreign particles included in the chemical reinforcement solution.

DESCRIPTION OF THE PREFERRED EMBODIMENTS

Figure 1:
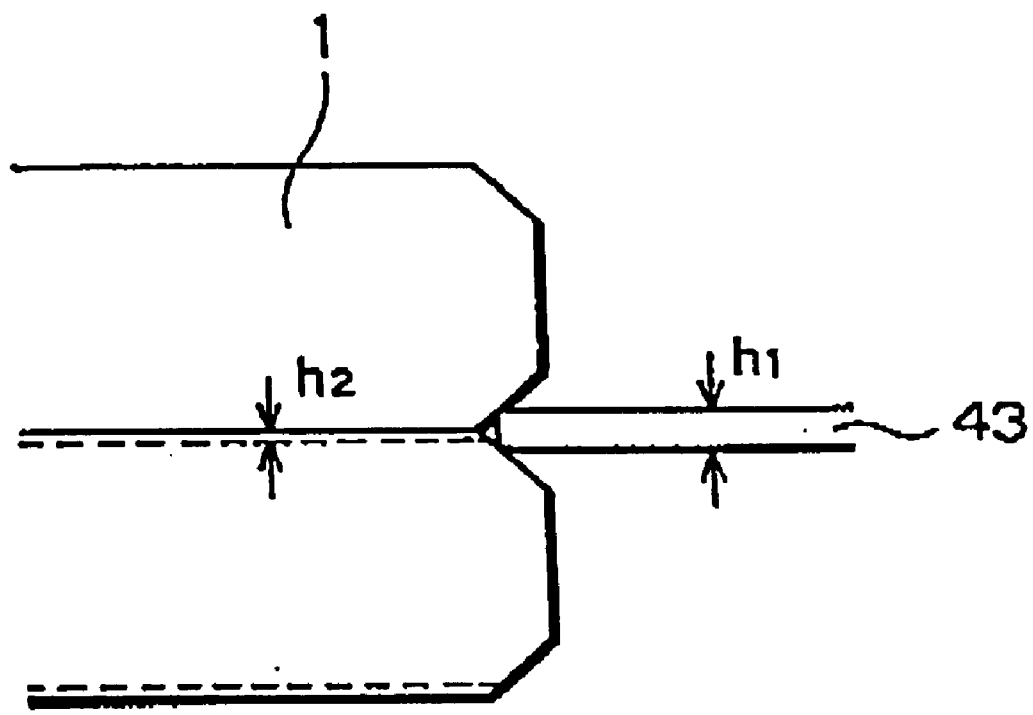
FIG. 1 shows a schematic view for use in describing a conventional method.

Referring to FIG. 1, description will be made about a conventional method for a better understanding of this invention. As shown in FIG. 1, a plurality of glass substrates 1 are directly stacked each other without any spacing left therebetween. Each of the glass substrates 1 has a side end surface specified by an outer side end surface in the illustrated example and a pair of edges chamfered on the side end surface. The chamfered edges of adjacent glass substrates 1 form a recessed portion of a V-shape.

It is assumed in the illustrated example that the side end surfaces of the stacked glass substrates 1 are ground by a grinding brush which has bristles of brush (simply called bristles) 43 having each a diameter h1 and are finally lapped by machining allowance h2 on each main surface during a final lapping process. As readily understood from FIG. 1, the diameter h1 of each of bristles 43 determines a limit of grinding. When each of the bristles does not reach, no ground portion inevitably takes place within the recessed portion, as illustrated in FIG. 1 and may be referred to as a remnant portion left unground.

If the machining allowance h2 is smaller than the remnant portion, the remnant portion is left on an end product without grinding or lapping. The remnant portion consequently brings about thermal asperity and weakens transverse rupture strength, as mentioned in the preamble of the instant specification.

Figure 2:
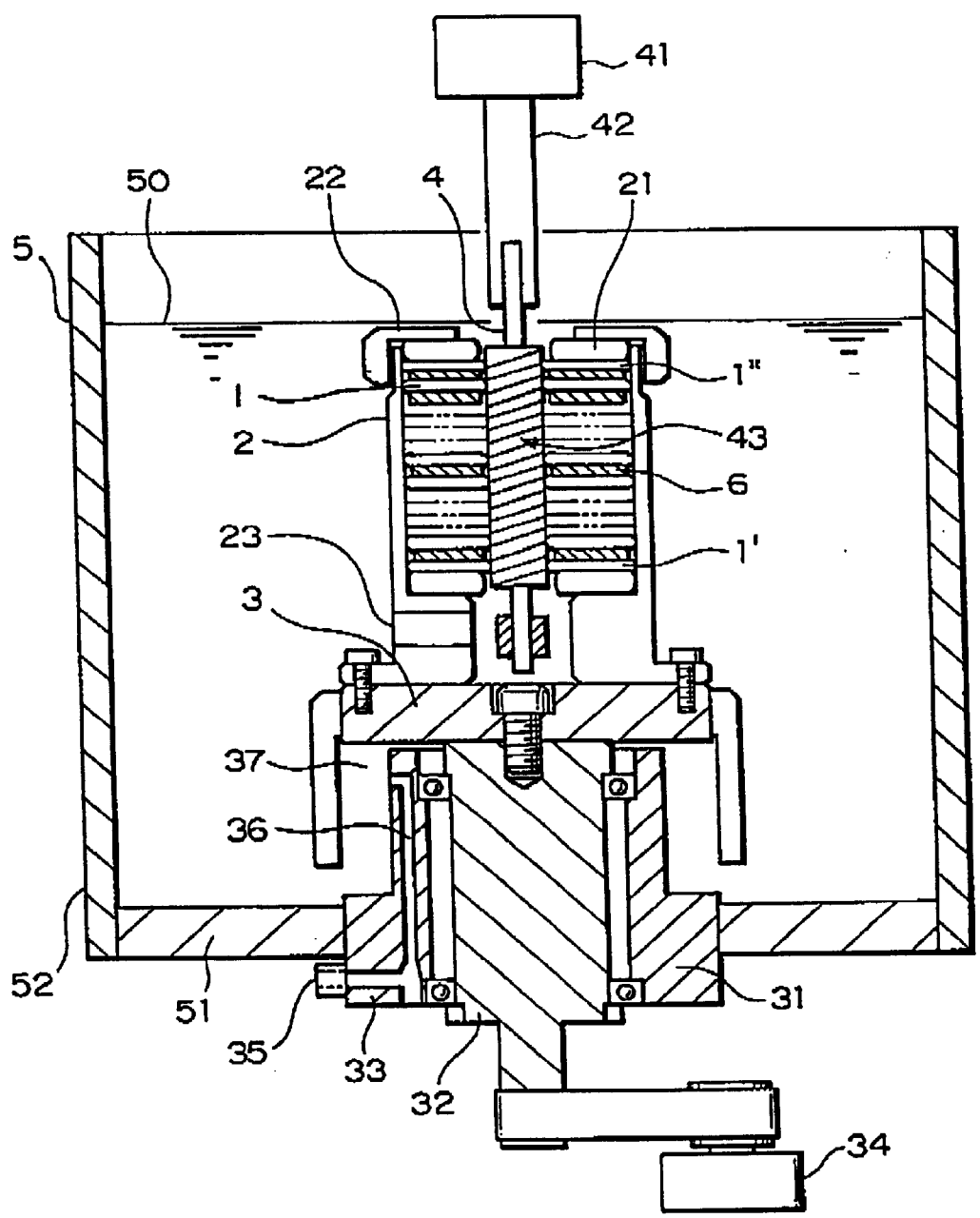
FIG. 2 shows a schematic sectional view for use in describing a grinding apparatus according to this invention.

Referring to FIG. 2, description will be made about a grinding apparatus which is operable in accordance with a grinding method according to this invention. The illustrated grinding apparatus is used for grinding inner side end surfaces of glass substrates 1, as shown in FIG. 3.

Figure 3:
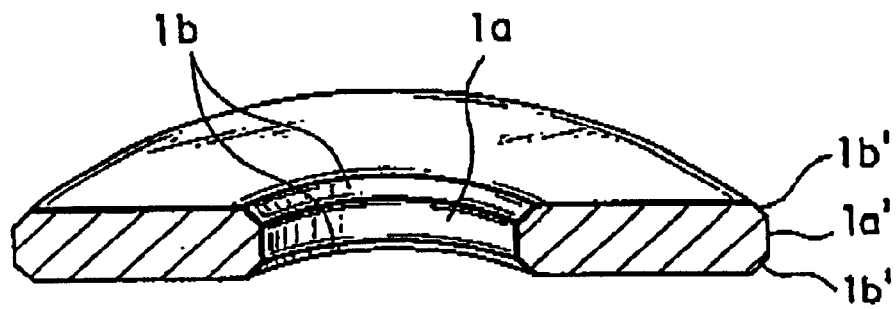
FIG. 3 shows a perspective sectional view of a glass substrate which is ground by the use of the grinding apparatus illustrated in FIG. 2.

In FIG. 3, the glass substrate 1 is shaped like in a ring and has main surfaces directed upwards and downwards and opposite to each other, an inner side end surface 1a, and an outer side end surface 1a'. The inner side end surface 1a is contiguous to a pair of chamfered portions 1b and, likewise, the outer side end surface 1a' is contiguous to a pair of chamfered portions 1b'. From FIG. 3, it is readily understood that the glass substrate has an inner hole defined by the inner side end surface 1a.

Referring back to FIG. 2, the grinding apparatus accommodates a great number of glass substrates 1 each of which serves to manufacture a magnetic disk and which may be simply called an MD substrate hereinafter. The grinding apparatus has a substrate housing or case 2 for accommodating the MD substrates 1 and immersing the same in a grinding solution, a support station 3 for rotatably supporting the substrate case 2, a rotatable brush 4 inserted within the inner holes of the MD substrates 1, an accommodation housing 5 for accommodating the grinding solution, and a plurality of spacers 6 interposed between two adjacent ones of the MD substrates 1.

The illustrated substrate case 2 has a clamping mechanism to fasten or hold the MD substrates 1 due to a coefficient of friction between the MD substrates 1 and the spacers 6 regardless of rotation of the substrate case 2 and the rotatable brush 4. To this end, the clamping mechanism has a collar 21 and a fastening cover 22 for fastening the MD substrates 1 via the collar 21. The illustrated substrate case 2 has a passage or conduit for 23 at a predetermined position to allow the grinding solution to flow between an outside and an inside of the substrate case 2.

The rotatable station 3 is coupled to a rotation axis portion 31 which is hermetically mounted to a center of a bottom plate 51 of the accommodation housing 5 and which has a rotation axis 31. Specifically, the rotatable station 3 is coupled to the rotation axis 31 which can be rotated in both a normal direction and a reverse direction by a rotation drive apparatus 34. The rotation drive apparatus 34 is variable in rotation speed and can adjust the rotation speed for a purpose of grinding. The rotation axis portion 31 has a rotation axis cover 33 which covers the rotation axis 32 and which has an air supply inlet 35 associated with an air passage 36 to supply an air to the accommodation housing 5. Such an air serves to form an air seal layer 37 between the rotation axis cover 33 and the support station 3 and to avoid invasion of the grinding solution into the rotation axis 33.

A cylindrical wall 52 is air-tightly attached to the bottom plate 51 of a circular shape to form the accommodation housing 5 for accommodating the grinding solution.

The rotatable brush 4 is connected to a rotation axis 42 of a rotation drive unit 41 and can be rotated in both a normal direction and a reverse direction. In an initial state, the rotatable brush 4 is adjusted so that a center of the rotatable brush 4 is coincident with a rotation center of the substrate case 2. The rotatable brush 4 has a mechanism (not shown)

which uses an air cylinder and the like to control a contact length of the bristles 43 with the MD substrates 1. With this structure, it is possible to adjust an amount of pushing the brush 4 onto the inner side end surfaces of the MD substrates 1 in a direction perpendicular to the rotation direction of the brush 4. The illustrated brush 4 can be also reciprocated upwards and downward by a cam mechanism (not shown) along the rotation direction and can thus perform reciprocation. Such reciprocations can vary directions of tips of the brush 4 with time and is effective to improve a surface state of the side end surfaces of the MD substrates 1.

The bristles 43 of the rotatable brush 4 may be, for example, nylon fibers which are curled and meandered and which have diameters between 0.1 and 0.3 mm and lengths between 5 and 120 mm. Vinyl chloride fibers, music wires, stainless wires, or pig bristles may be used instead of the nylon fibers. At any rate, fibers may be used which are low in hardness and high in flexibility. Such fibers can prevent abrasive force from being excessively large by elastic deformation of the bristles 43 and defects, such as scratches, from undesirably occurring on the side end surfaces. In addition, the curled fibers snugly contact with recessed portions, or the like and can effectively grind the chamfered portion 1b and 1b' of the MD substrate 1 shown in FIG. 3. However, straight fibers without any curls may be used when the chamfered portions 1b, 1b' may not be ground with high efficiency. Moreover, a grinding speed becomes high if the bristles 43 are formed by resin mixed with grinding materials.

The grinding materials which are included in the grinding solution 50 may be cerium oxide. Instead, iron oxide, magnesium oxide, zirconium oxide, manganese oxide, colloidal silica, and etc. may be used as the grinding materials. Preferably, the grinding materials have hardness close to a substrate to be ground (the MD substrate 1) and in this view point, cerium oxide is preferable as the grinding materials when a glass substrate is ground. On the other hand, it is not preferable to use a grinding material which is excessively high in hardness as compared with the glass substrate or a grinding material which is very low or soft in hardness. This is because the grinding material of the excessively high hardness gives any defect or faults on the side end surfaces of the MD substrate while the grinding material of so soft hardness can not form a mirror surface.

It is preferable that an average particle size of the grinding material falls within a range between 1 and 4 µm. The grinding material less than 1 µm is weak in abrasive or grinding force and allows the tips of the rotatable brush 4 to directly contact with the side end surfaces of the MD substrates 1 and to grind the side end surfaces with the tips of the brush 4 contacted with the side end surfaces. This makes it difficult to control or grind the chamfered portions 1b, 1b' in a predetermined shape. As a result, boundaries between the side end surfaces 1a and the chamfered portions 1b (see FIG. 3) are undesirably slack.

To the contrary, the grinding material greater than 4 µm brings about roughening the side end surfaces and is liable to be precipitated on the bottom of the accommodation housing 5. This means that the side end surface grinding is often performed without any grinding materials which are to be interposed between the rotatable brush 4 and the MD substrates 1. In consequence, a desired surface roughness can not be achieved by using the grinding material greater than 4µm.

As a material of the grinding pad, it is possible to exemplify suede, soft polisher formed by velour, and hard polisher formed by hard velour, foamed urethane, pitch impregnated suede, or the like.

Furthermore, each spacer 6 is interposed between two adjacent ones of the MD substrates 1 so as to securely prevent unground remnant portions from occurring on the chamfered portions of the inner and the outer side end surfaces of the MD substrates 1. Each spacer 6 is also effective to reliably prevent defects from occurring on the MD substrates 1 during the side end surface grinding. For this purpose, each of the spacers 6 has a circular shape with a circular hole in a center area thereof like in the MD substrates 1.

Figure 4:
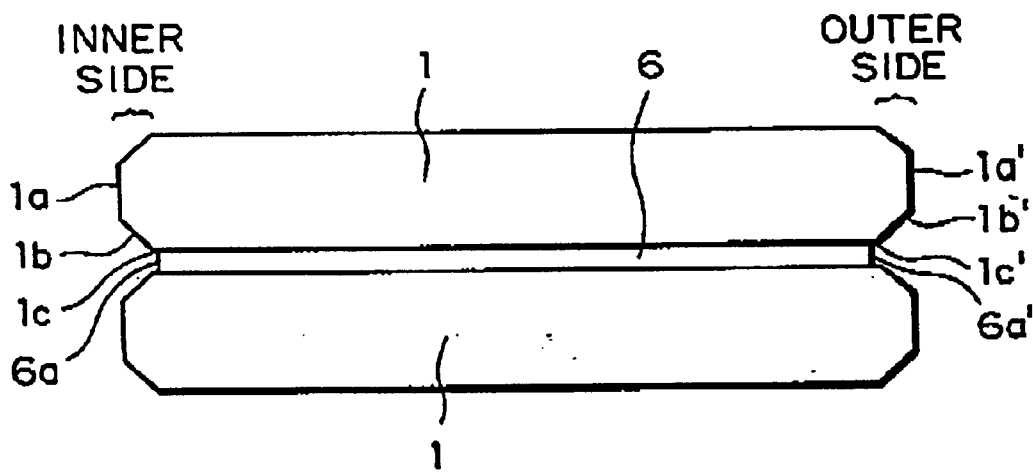
FIG. 4 shows a partial view of a stack of substrates piled up via a spacer.

Referring to FIG. 4, a half of the spacer 6 is illustrated together with halves of two MD substrates 1 and has an inner side surface 6a and an outer side surface 6a' positioned on the lefthand side and the righthand side of FIG. 4, respectively. As shown in FIG. 4, each of the illustrated MD substrates 1 has the side end surfaces 1a, 1a' and the chamfered portions 1b, 1b' contiguous to the side end surfaces 1a, 1a' and extended to end portions 1c, 1c'. Therefore, the chamfered portions 1b, 1b' are terminated at the end portions 1c, 1c', respectively.

The illustrates spacer 6 is placed inside the end portions 1c, 1c' of the chamfered portions of the MD substrates 1. Specifically, the inner side surface 6a and the outer side surface 6a' of the spacer 6 are remote from the end portions 1c, 1c' of the MD substrates 1 inside of the MD substrates 1 by a distance between 0 and 2 mm (preferably, between 0.5 and 2 mm). Such a distance is adjusted and determined in accordance with each size of the MD substrates 1.

When the inner and the outer side surfaces 6a, 6a' are placed inside of the end portions 1c, 1c' of the chamfered portions 1c, 1c', the bristles can partially enter into regions of the main surfaces of the MD substrates 1, although entered regions depend on the diameters of the bristles. Thus, the end portions 1c, 1c', namely, ridge portions between the main surfaces and the chamfered portions 1b, 1b' are ground by the bristles 43 into rounded shapes.

Alternatively, let the inner and the outer side surfaces 6a, 6a' be coincident with the end portions 1c, 1c' of the MD substrates 1. In this event, the bristles 43 can not be entered into the partial regions of the main surfaces of the MD substrates 1 and, as a result, the end portions 1c, 1c' can not be ground in rounded shapes. Herein, it is to be considered that it is actually difficult to make the side surfaces 6a, 6a' of the spacers 6 coincide with the end portions 1c, 1c' of the MD substrates 1 and this makes it difficult to locate the spacers 6 between the MD substrates 1.

To the contrary, no problem takes place even when the spacers 6 are located inside of the MD substrates 1 because the main surfaces of the MD substrates 1 are also ground by the rotatable brush 4. This shows that the end portions 1c, 1c' may be rounded during the side end surface grinding of the MD substrates 1.

Each spacer 6 may have a thickness which is adjusted in accordance with the diameters of the bristles 43. The thickness of each spacer 6 preferably ranges between 0.1 and 0.3 mm.

In addition, it is preferably that each spacer 6 is formed by a soft substance which is selected from a group consisting of polyurethane, acrylic acid resins, plastics, rubber, and the same materials as the materials of the grinding pad and which may be softer than that of the MD substrate 1. Specifically, the substance of each spacer may be soft to some extent of preventing breakage of the MD substrates 1 which might otherwise take place due to a pressure imposed onto the MD substrates 1 by the grinding brush 4 and the grinding pad. For example, if the grinding pad is formed by the same material as the spacers, each of the spacers 6 may preferably have a hardness between 15° and 90° when the hardness is represented by the Shore A hardness.

Now, description will be made as an example about a method according to this invention performed by the use of the grinding apparatus shown in FIG. 2.

At first, the rotatable brush 4 is lifted up over the substrate case 2 by a predetermined spacing and is placed over the substrate case 2. A large number of the MD substrates 1 are prepared which are already subjected to a chamfering process and which have the chamfered portions, such as 1b, 1b'. Under the circumstances, the MD substrates 1 and the spacers 6 of polyurethane (having a thickness of 0.1 mm) are alternately arranged or located within the substrate case 2 to form a substrate block and, thereafter, the collars 21 are placed under and on the substrate block. The fastening cover 22 is fastened on the collar 21 to clamp the substrate block with the collars 21. An axial deviation of the inner holes of the MD substrates 1 is determined on dependency upon a clearance resulting from a size difference between an inner peripheral portion of the substrate case 2 and the outer side end surfaces of the MD substrates 1. The clearance may be adjusted due to circularity of the inner peripheral portion of the substrate case 2 and practically falls within an appropriate range from clearance engagement to intermediate engagement, both of which are defined by JIS B 0401 (1986) in connection with engagement. An axial deviation of the inner hole of each spacer 6 is determined by a working process used in installing the spacers 6.

Next, the substrate case 2 filled with the MD substrates 1 is attached to the support station 3. The rotatable brush 4 which has a center axis coaxial with the rotation center of the substrate case 2 is inserted inside the inner side end surfaces of the MD substrates 1, as illustrated in FIG. 2. The rotatable brush 4 is moved downwards of FIG. 2 and stopped at a position where a range of flocked fibers of the brush 1 completely covers from a lowermost one 1' of the MD substrates 1 to an uppermost one 1" of the MD substrates 1.

Thereafter, the accommodation housing 5 is filled with an appropriate amount of the grinding solution 50. Specifically, the grinding solution 50 is filled to a depth such that an upper surface of the fastening cover 22 is slightly sunk under a solution level of the grinding solution 50. The amount of the grinding solution 50 is determined in accordance with each purpose of the grinding. The grinding solution 50 may be filled before or simultaneously with insertion of the rotatable brush 4 into the inner side end surfaces of the MD substrates 1.

Next, the pushing pressure of the rotatable brush 4 onto the MD substrates 1 is adjusted so that the bristles 43 of the rotatable brush 4 are brought into contact with the inner side end surfaces of the MD substrates 1. During the adjustment, the top positions of the bristles 43 are pressed onto the inner side end surfaces of the MD substrates 1 by 1 to 2 mm when the bristles 43 are formed by the curled nylon fibers.

As mentioned before, such adjustment is preferably performed by the mechanism using the air cylinders or the like so as to control a contact pressure of the brush 4 imposed on the inner side end surfaces of the MD substrates 1. For example, when the bristles 43 are hard in hardness, a pneumatic pressure of the air cylinder preferably falls with a range between 0.05 and 0.1 MPa while the pneumatic pressure preferably falls within a range between 0.05 and 0.3 MPa when the bristles are soft in hardness.

Now, the side end surface grinding is performed by rotating the support station 3 and the rotatable brush 4 in opposite directions relative to each other. In this case, a preferable rotation speed of the rotatable brush 4 ranges from 1000 rpm to 2000 rpm during an idle running time.

In the illustrated example, the rotation speed of the support station 3 is set to 60 rpm and the rotation speed of the rotatable brush 4 is set to 6000 rpm in the grinding solution 50 (10000 rpm during the idle running time). The grinding is performed for about ten minutes.

When a predetermined amount is ground, the illustrated apparatus is stopped and the grinding solution is exhausted to a depth such that the substrate case 2 can be detached from the support station 3 with the rotatable brush 4 lifted up to a position where no trouble takes place. Thereafter, the substrate case 2 is taken out of the accommodation housing 5. Finally, the MD substrates 1 ground are detached from the substrate case 2 in an order reverse to the setting order.

Evaluation:

The surface roughness on the inner side end surfaces 1a and the chamfered portions 1b of the MD substrates ground in the above-mentioned manner have been measured by "Surftest SV-600" (trademark) manufactured and sold by Mitutoyo. As a result of measurement, it was confirmed that the MD substrates 1 had surface roughness of 0.69 $\mu$m and 0.08 $\mu$m represented by Rmax and Ra, respectively. When the side end surfaces of the MD substrates 1 ground were observed by an electron microscope which had a magnifying power of 4000, it was found out that the side end surfaces were completely mirror finished and did not have any unground remnant portions.

Embodiment 2:

In this embodiment 2, a glass substrate and a magnetic recording medium are manufactured through the following processes.

(1) Rough lapping process:

At first, molten glass is directly pressed by the use of an upper die, a lower die, and a blow mold into a first and a second glass plate of a disk shape. The first glass plate has a diameter of 66 mm (2.5 inches), a thickness of 1.2 mm while the second glass plate has a diameter of 96 mm (3.5 inches) and a thickness of 1.5 mm. Instead of the direct pressing, either down drawing or floating may be used to form a glass sheet which is cut by a grinding stone into a disk shaped glass plate.

The glass shaped in the above-mentioned manner comprises, by mol %, as main components, 57 to 75% of $SiO_2$, 0 to 2.8% of $ZrO_2$, 3 to 15% of $Al_2O_3$, 7 to 16%of $LiO_2$, and 4 to 14% of $Na_2O$. This shows that the glass is alumino-silicate glass which can be chemically reinforced.

Each glass plate is subjected to lapping. This lapping process is for improving a precision in size and contour and is performed by a lapping apparatus with abrasive particles having a grain size of #400. Specifically, the abrasive particles are alumina abrasive particles of #400 and a load given to each glass plate is set to 100 kg. Under the circumstances, inner and outer gears of the lapping apparatus are rotated to lap both main surfaces of each glass plate accommodated in a carrier of the lapping apparatus. Each glass plate is lapped until the profile irregularity and the surface roughness (Rmax) reach to 0 to 1 $\mu$m and 6 $\mu$m, respectively. The surface roughness (Rmax) is measured in accordance with JIS B 0601.

(2) Shaping process:

Next, a circular hole is opened at the center region of each glass plate by the use of a cylindrical grinder and has a diameter of 20 mm. Thereafter, a predetermined chamfering process is performed on an outer peripheral side surface and an inner peripheral side surface of each glass plate. Each of the outer and the inner peripheral side surfaces has surface roughness (Rmax) of about 4 μm.

(3) Second lapping process:

Subsequently, a second lapping process is carried out by the use of a lapping apparatus about each glass plate shaped in the above-mentioned manner. In this event, each glass plate is lapped by alumina abrasive particles having a grain size of #1000, with a load of 100 kg imposed on each glass plate and by rotating inner and outer gears. The resultant glass plate has a flatness of 3 μm and a surface roughness of about 2 μm in Rmax and 0.2 μm in Ra, when measurement is made by the AFM. Thus, a first MD substrate for 2.5 inches and a second MD substrate for 3.5 inches are obtained by the above lapping process and have thicknesses of 0.68 mm and 1.03 mm, respectively.

Each of the first and the second MD substrates is successively immersed into cleaning baths of neutral detergent and water to be cleaned.

(4) Side end surface grinding process:

The inner side end surfaces of the respective MD substrates are ground by the use of the grinding apparatus and the method mentioned with reference to FIG. 2.

During the side end surface grinding process, no breakage takes place in each of the first and the second MD substrates. It is to be noted that any defects are not observed even when the first MD substrate which is thin in thickness is ground on the inner side end surface.

The side end surface grinding process may be performed after either a first polishing process of a second polishing process that will be described later when a grain size of the abrasive particles used in the side end surface grinding is smaller than that used in each of the first and the second polishing processes. Such a side end surface grinding process carried out after either one of the first and the second polishing processes is more effective to avoid, on the main surfaces of each MD substrate, defects which might occur when the stacked MD substrates are subjected to the side end surface grinding process. Herein, it is to be noted that the MD substrate becomes thin in thickness after each polishing process is performed to polish the MD substrate and that surface defects become serious as the processes proceed. Each MD substrate is cleaned by water after completion of the side end surface grinding process.

(5) First polishing process:

Next, each MD substrate is subjected to the first polishing process. The first polishing process is performed by a polishing apparatus to remove damages and/or deformations left after the side end surface grinding process, namely, a sand blast process. Specifically, the first polishing process is carried out by using, as a polishing fabric, a hard polisher (LP 66) manufactured and sold by Maruishi Industries Co. Ltd. in Japan on the following conditions.

| | |
|---|---|
| Grinding solution or liquid: | cerium oxide plus water |
| Load (L): | 300 g/cm$^2$ (L =238 kg) |
| Polishing time: | 15 minutes |
| Quantity of removal: | 30 μm |
| Rotation speed of lower base: | 40 rpm |
| Rotation speed of upper base: | 35 rpm |

-continued

| | |
|---|---|
| Inner gear rotation speed: | 14 rpm |
| Outer gear rotation speed: | 29 rpm |

Each MD substrate finished by the first polishing process is successively immersed into each cleaning bath of neutral detergent, pure water, pure water, IPA (isopropyl alcohol), and IPA (steam seasoning) to be cleaned.

(6) Second polishing process:

After the first polishing process, the second polishing process is performed by a polishing apparatus by using a soft polisher instead of the hard polisher. The soft polisher may be, for example, #1900W manufactured by Daiichi Lace Co. Ltd. The second polishing process is progressive on the same conditions as the first polishing process except that the load, the polishing time, and the quantity of removal are changed to 100 g/cm$^2$, 5 minutes, and 5 μm, respectively. Each MD substrate that is subjected to the second polishing process is successively immersed into each cleaning bath of hydrofluosilicic acid, neutral detergent, pure water, pure water, IPA, and IPA (steam seasoning) to be cleaned. In addition, each cleaning bath is given a ultrasonic wave.

(7) Chemical reinforcement process:

Next, chemical reinforcement process is performed about each MD substrate subjected to the second polishing process. In this event, the chemical reinforcement process is carried out by preparing a chemical reinforcement solution formed by mixing potassium nitrate (60%) with sodium nitrate (40%), heating the chemical reinforcement solution to a temperature of 400° C., and by immersing, into the chemical reinforcement solution, each MD substrate previously heated to a temperature of 300° C. for about 8 hours. On immersing, each MD substrate is accommodated into a holder with the side end surfaces of each MD substrate supported by the holder.

When the MD substrates are immersed into the chemical reinforcement solution in the above-mentioned manner, they are chemically reinforced because lithium ions and sodium ions in a surface layer of each MD substrate are replaced by sodium ions and potassium ions included in the chemical reinforcement solution. As a result, the surface layer of each MD substrate is transformed into a compressive stress layer.

Practically, the compressive stress layer is about 100 μm to 200 μm thick. After the chemical reinforcement process, each MD substrate is immersed into a water bath of 20° C. to be quenched and kept for about 10 minutes.

The quenched MD substrates are immersed into concentrated sulphuric acid heated to a temperature of 40° C. to be cleaned. Each cleaned MD substrate is further cleaned by successively immersing each bath of pure water, pure water, IPA, and IPA (steam seasoning) with a ultrasonic wave given to each bath.

Evaluation:

The MD substrates obtained through the above-mentioned processes have surface roughnesses (Ra) of 0.028 μm and 0.030 μm at the chamfered portion 1b and the inner side end surface 1a (see FIG. 3), respectively. The surface roughness on each main surface of the MD substrates falls within a range between 0.3 and 0.7 nm when it is measured by the AFM. None of unground remnant portions are observed on the side end surfaces of each MD substrate even when observation is made by using an electron microscope with the magnifying power of 4000. Thus, each side end surface is kept in a mirror finish state.

Besides, foreign materials or cracks are not recognized on the inner side end surfaces of the MD substrates and foreign materials and particles which bring about thermal asperity are also not observed on the main surfaces of the MD substrates.

Figure 5:
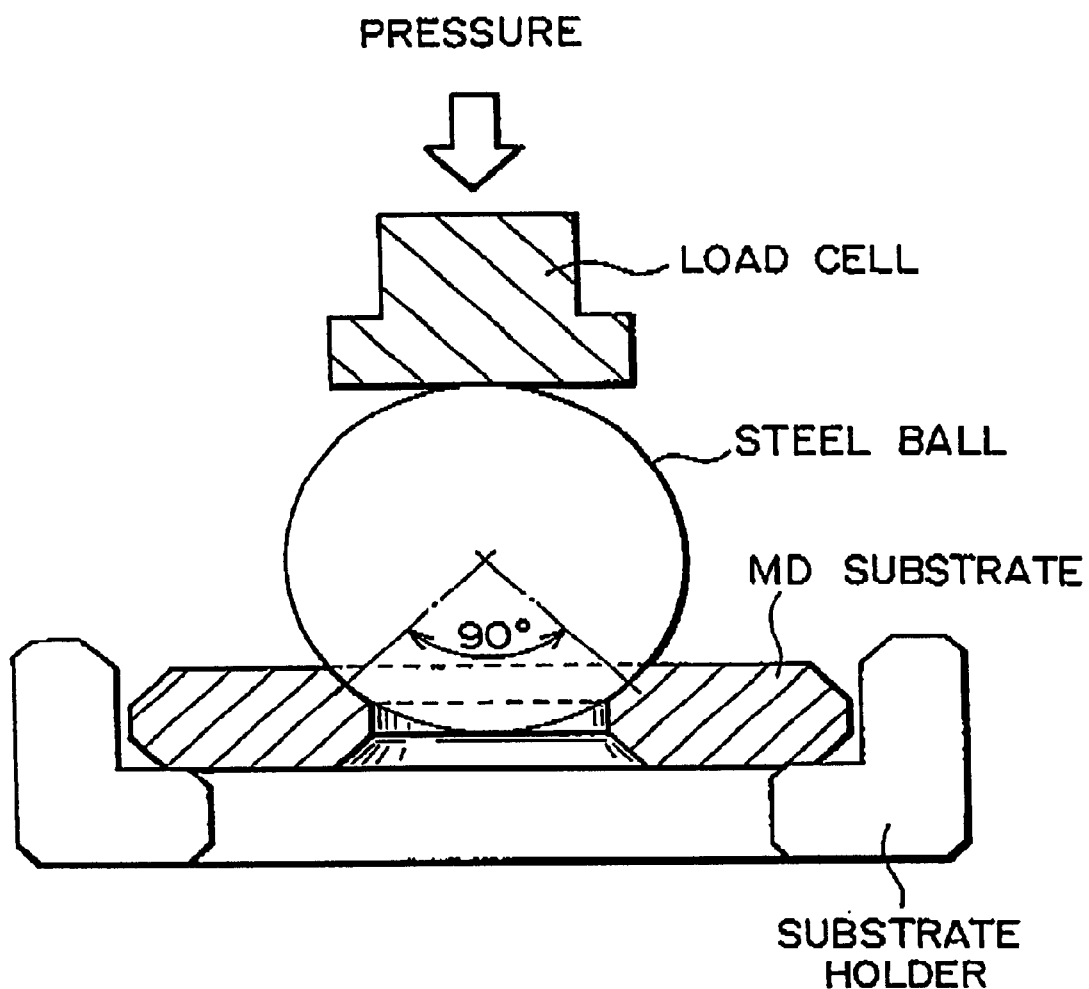
FIG. 5 shows a sectional view of a transverse rupture strength tester used for measuring the substrates.

Each MD substrate is subjected to a transverse rupture test by using a transverse rupture strength tester ("Autograph DDS-2000" sold by Shimadzu) illustrated in FIG. 5. Each of the MD substrates has a transverse rupture strength between 15 and 20 kg. When a level of the chemical reinforcement is raised or changed, the resultant strength reaches to about 15 to 20 kg.

(8) Magnetic disk production process:

A magnetic disk for an MR head is manufactured or produced by successively depositing, by an in-line type sputtering apparatus, a seed layer of NiAl, an underlying layer of CrMo, a magnetic layer of CoPtCrTa, and a protection layer of carbon hydride and by thereafter depositing a lubricant layer of purfluoropolyether (PFPE) by a dipping method.

It has been confirmed that the magnetic disk has no defects in the magnetic layer and the like. When the each magnetic disk has been tested by the glide test, neither hits nor crashes have been recognized. In addition, no malfunction took place due to the thermal asperity when a reproduction test was executed by an MR head.

Figure 6:
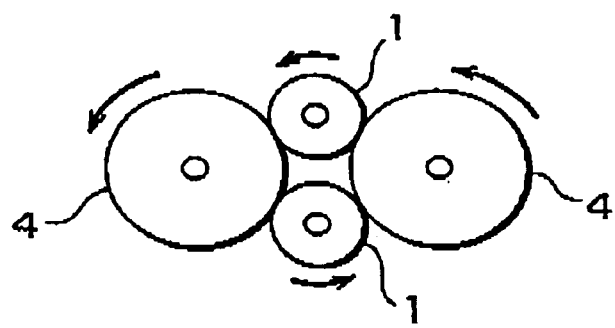
FIG. 6 shows a view for describing a grinding operation.

Embodiment 3:

Referring to FIG. 6, a rotatable brush 4 of 500 mm in diameter is rotated at a rotation speed between 700 and 1000 rpm after the inner side end surface grinding mentioned in the embodiment 2. The rotatable brush 4 has hairs with lengths between 10 and 30 mm and with a diameter between 0.1 and 0.3 mm.

Furthermore, the MD substrates 4 (700 sheets) stacked via the spacers 6 in the manner illustrated in FIG. 2 are rotated at a rotation speed of 60 rpm for 30 minutes to grind the outer side end surfaces of the MD substrates 4 by spraying a grinding solution. Thereafter, the MD substrates 1 are immersed like in the embodiment to manufacture the glass substrate and the magnetic recording medium.

The inner and outer side end surfaces of each MD substrate are observed by the use of an electron microscope (the magnifying power of 4000). As a result, none of the unground remnant portions are found out on each MD substrate and recording medium. Specifically, the outer side end surface has a surface roughness of 0.51 $\mu$m and 0.08 $\mu$m in terms of Rmax and Ra, respectively. Thus, not only the inner side end surface but also outer side end surface are ground during the side end surface grinding process in the embodiment 3. This method is advantageous in that it is possible to suppress occurrence of any dust not only from the inner side end surface but also from the outer side end surface and to keep both surfaces clean.

The transverse rupture strength is measured by using the transverse rupture strength tester illustrated in FIG. 5 and falls within a range between 18 and 22.5 kg. The substrates varied in the level of the chemical reinforcement reach to a range between 10 and 25 kg.

Alternatively, when no grinding is carried out on the inner and outer side end surfaces, the transverse rupture strength is between 5 and 9 kg.

From this fact, it is understood that the transverse rupture strength can be remarkably increased when the inner side end surface is ground. This shows that a state of the inner side end surface strongly influences the transverse rupture strength and that the transverse rupture strength can be varied by changing the chemical reinforcement level.

Embodiment 4:

The MD substrate and the magnetic recording medium are manufactured in a manner similar to the embodiment 3 except that a grinding pad is used instead of the rotatable brush 4. The grinding pad has the Shoe A hardness of 50°. It has been found out that none of the unground remnant portions are left on the inner and outer side end surfaces and the surface roughness Ra on the outer side end surfaces is 0.03 $\mu$m and 0.01 $\mu$m at the chamfered portions and the outer side end surface, respectively. Likewise, the surface roughness Ra on the inner side end surface is 0.03 $\mu$m and 0.01 $\mu$m at the chamfered portions and the inner side end surface, respectively.

Embodiment 5:

According to the embodiment 5, a MD substrate and a magnetic recording medium are manufactured in a manner similar to the embodiment 3 except that the outer side end surfaces of the glass plates are at first ground and thereafter the inner side end surfaces thereof are ground. Namely, the order of the side end surfaces is changed from that of the embodiment 3. The resultant outer and inner side end surfaces have no unground remnant portions when the electron microscope (the magnifying power of 4000) is observed. The surface roughness of the outer side end surfaces is specified by Rmax:0.17 $\mu$m and Ra:0.02 $\mu$m on each side end surface portion and by Rmax:0.63 $\mu$m and Ra:0.12 $\mu$m on each chamfered portion. Likewise, the surface roughness of the inner side end surfaces is specified by Rmax:0.25 $\mu$m and RA:0.03 $\mu$m on the inner side end surface portions and by Rmax:0.70 $\mu$m and Ra:0.10 $\mu$m on the chamfered portions. In addition, adhesion of any foreign materials is not observed at portions supported by the holder due to a liquid sump which results from a chemical reinforcement solution or liquid when the chemical reinforcement is carried out. It is also confirmed that the obtained magnetic recording medium has, on the magnetic layers and so on, no defects due to the foreign materials and that neither hits nor crashes are found during the glide test. No disorder or malfunction resulting from the thermal asperity is not recognized during reproducing operation.

Comparative samples:

In order to prove the effect of the embodiments according to this invention, comparative glass substrates and comparative magnetic recording media are manufactured as the comparative samples without using any spacers during side end surface grinding process. It is noted that the side end surface grinding process is performed in connection with the comparative sample before the second lapping process (mentioned before).

Prior to the side end surface grinding, the comparative glass substrate for 2.5 inches has a thickness of 0.9 mm while the comparative glass substrate for 3.5 inches has a thickness of 1.27 mm. The thicknesses of the comparative glass substrates are thicker than those of the MD substrates according to this invention. This is for avoiding breakage of the comparative samples resulting from the grinding brush used in the side end surface grinding process.

After the side end surface grinding process, the inner side end surface (side wall portion 1a and chamfered portion 1b) are observed by the electron microscope (the magnifying power of 4000) and a microscope (magnifying power of 400). It is found out that the surface roughness of the comparative glass substrate is equivalent to that of the embodiment 2 on the side wall portion 1a but is inferior to that of the embodiment 2 on the chamfered portion 1b in the presence of unground remnants partially left on the main surface of the comparative glass substrate.

After the polishing process, the outer side end surface (side wall portion 1a' and chamfered portion 1b') is observed by the electron microscope (magnifying power of 4000). The surface roughness on the side wall portion 1a' and the chamfered portion 1b' are reduced to Rmax:1.87 μm and Ra:0.33 μm due to the grinding particles used in the second lapping process.

During the glide test, some head crashes take place in the comparative magnetic recording medium and reproduction errors or faults are also observed due to the thermal asperity.

Comparative samples 2:

As the comparative samples 2, comparative glass substrates and recording media are manufactured in a manner similar to the embodiment 2 except that no spacer is used in connection with the comparative samples 2. In this case, the comparative glass substrates for the 2.5 inches magnetic disk are often broken when the they are clamped in the holder before the side end surface grinding and when they are ground by the rotatable brush during the side end surface grinding. This is because the comparative glass substrates are too thin.

Embodiments 5 and 6:

Instead of the alumio-silicate glass, the embodiments 5 and 6 use soda line glass and soda-aluminosilicic-acid glass as glass materials for forming the glass substrates, respectively. In the embodiments 5 and 6, the MD substrates and the corresponding magnetic recording media are manufactured under the same as the embodiments 2 and 3 except for glass compositions mentioned above.

The MD substrates of soda lime glass are somewhat rough on the surface roughness of the outer and the inner side end surfaces in comparison with the MD substrates of aluminosilicate glass. However, no practical problems take place in connection with the MD substrates and the magnetic recording media according to the embodiments 5 and 6.

Embodiments 7:

In the embodiment 7, provision is made of the MD substrates obtained in the manners mentioned in connection with the embodiments 2 and 3. On both the main surfaces of each MD substrate, successively deposited by an in-line type sputtering apparatus are an underlying layer composed of Al (50 angstroms thick)/Cr (1000 angstroms thick)/CrMo (50 angstroms thick), a magnetic layer of CoPtCr (120 angstroms thick)/CrMo (50 angstroms thick). thick), and a protection layer of Cr (50 angstroms thick). As a result, a magnetic disk body is obtained.

The magnetic disk body is immersed into an organosilicic compound solution in which silica fine grains are dispersed and which are specified by a mixed solution of water, IPA, and tetraethoxysilane. Thereafter, the magnetic disk body is fired to form a protection layer of $SiO_2$ which has a texture function and is subjected to a dipping process by a lubricant of perfluoropolyether (PFPE) to form a lubricant layer. Thus, the magnetic disk is obtained as the magnetic recording medium for the MR head.

It is confirmed that the magnetic disk according to the embodiment 7 has characteristics similar to those of the embodiments 2 and 3.

Embodiment 8:

The magnetic disk according to the embodiment 8 is similar to the magnetic disk according to the embodiment 7 except that the former has the underlying layer of Al/Cr/Cr and the magnetic layer of CoNiCrTa. The magnetic disk according to the embodiment 8 is used as the magnetic recording medium for a thin film magnetic head and has the same characteristics as the magnetic disk according to the embodiment 7.

Figure 7A:
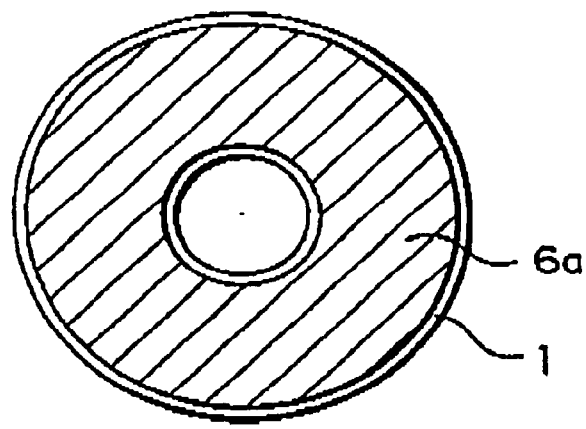
FIGS. 7A, 7B, and 7C show configurations of the spacers.
Figure 7B:
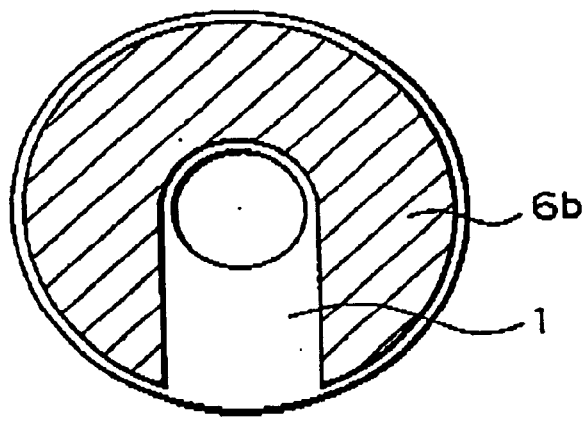
Figure 7C:
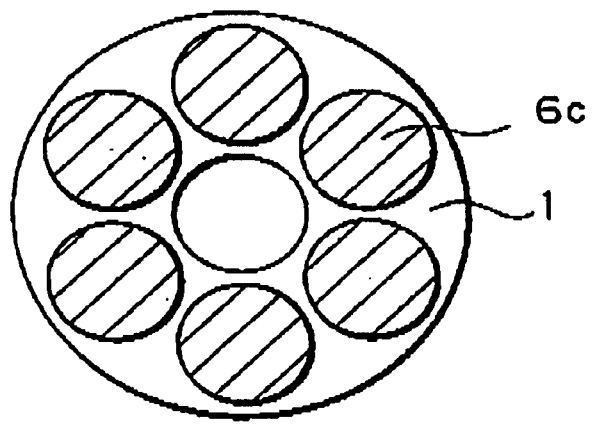

Embodiment 9:

Referring to FIGS. 7A, 7B, and 7C, the side end surface grinding process is performed by using various types of the spacers interposed between the MD substrates. The remaining processes of manufacturing the MD substrates and the magnetic recording media are similar to those mentioned in conjunction with the embodiment 2. Herein, description will be made about a procedure executed from the second lapping process to the side end surface grinding process.

In FIG. 7A, a single spacer 6a is laid all over the main surface of the glass substrate or MD substrate 1 and has therefore a disk shape similar to the glass substrate. In FIG. 7B, a single spacer 6b is partially cut away like a bay and covers the glass substrate 1 partially left uncovered with the single spacer 6b. The spacer 6c illustrated in FIG. 7C is divided into a plurality of partial spacers each of which is circular in shape. All of the spacers 6a to 6c serve to effectively perform the side end surface grinding process mentioned before.

Figure 8:
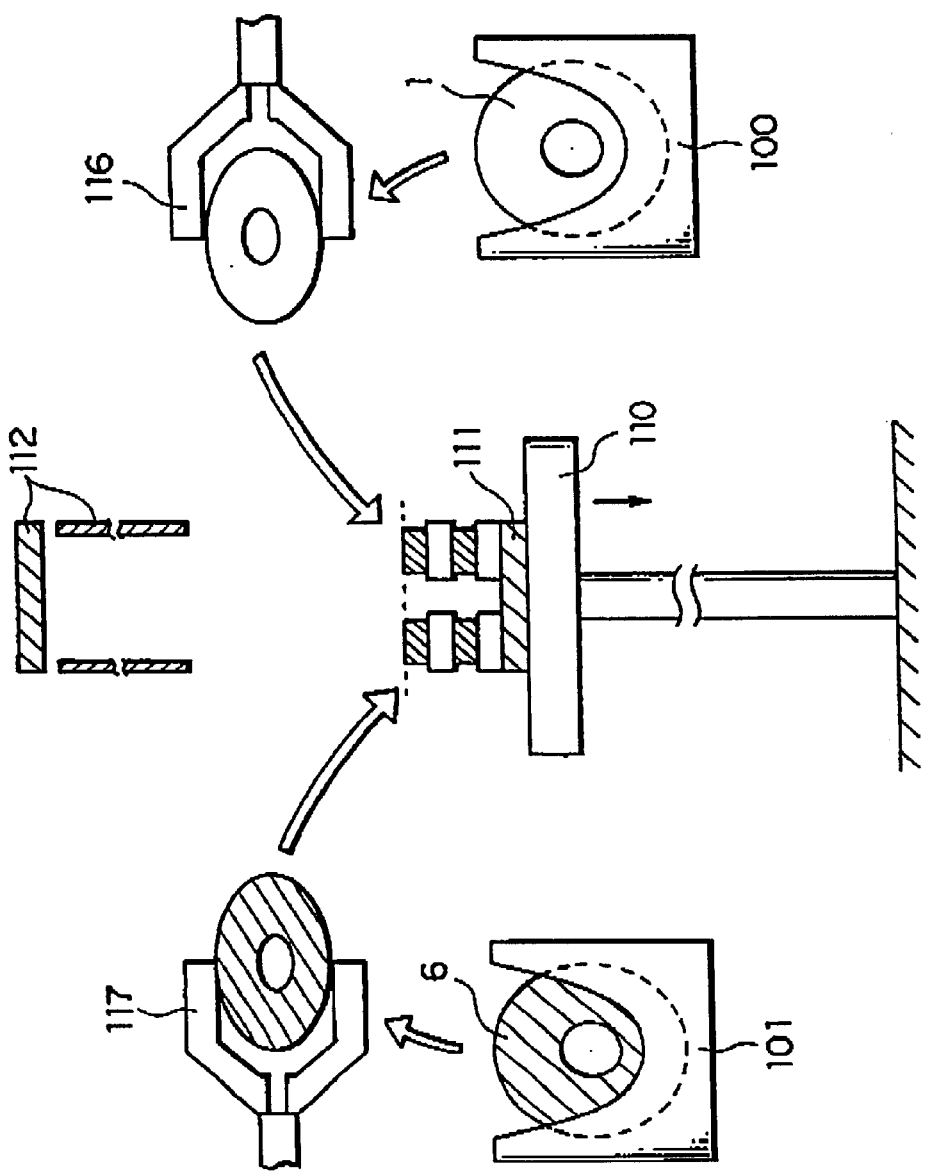
FIG. 8 shows a view for describing stacking operation of the substrates and the spacers.
Figure 10:
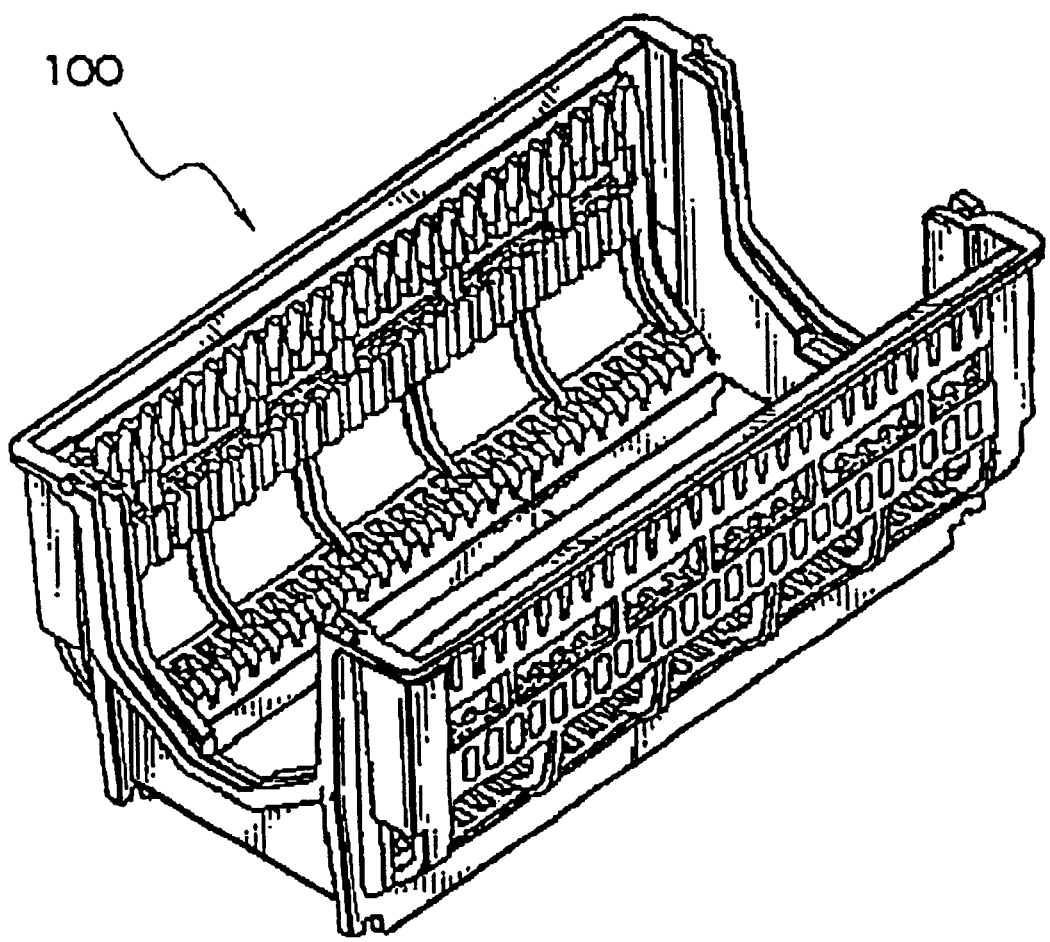
FIG. 10 shows a perspective view of a disk case usable in the method mentioned in FIG. 9.

Referring to FIG. 8, illustration is made about a machine for automatically interposing each spacer 6a (FIG. 7A) between the glass substrates. Before inserting each spacer 6a, the glass substrates are accommodated in a disk case 100 shown in FIG. 10, after they are subjected to the second lapping process and are thereafter cleaned and dried. In FIG. 10, twenty-five sheets of the glass substrates are accommodated in the disk case 100.

On the other hand, twenty-four spacers are prepared to be interposed between two adjacent ones of the glass substrates and are less in number than the glass substrates by one. The spacers are also accommodated in a spacer case 101 similar to the disk case 100.

Both the glass substrates 1 and the spacers 6 are alternately sent to a grinding apparatus which is similar to that illustrated in FIG. 2. The grinding apparatus has a grinding stage 110, a first grinding jig 110 on the grinding stage 110, and a second grinding jig 112.

Each of the glass substrates 1 accommodated in the disk case 100 can be taken out of the disk case 100 by a first robot hand 116 one by one while each spacer 6 is also taken out of the spacer case 101 by a second robot hand 117. The first and the second robot hands 116 and 117 are alternately operated to convey the glass substrates 1 and the spacers 6 onto the grinding stage 110 one by one in an illustrated manner. As a result, the glass substrates 1 and the spacers 6 are alternately and successively stacked or piled up on the first grinding jig 111 placed on the stage 110.

In addition, the stage 100 is moved downwards and upwards of FIG. 8 so that the glass substrates 1 and the spacers 6 transported by the first and the second robot hands 116 and 117 are successively located on the states at the predetermined heights or locations from the ground, respectively. Specifically, the stage 110 is lowered by a thickness of each of the glass substrate 1 or the spacers 6 each time when a single one of either the glass substrates 1 or the spacers 6 is placed on the first grounding jig 111 or either one of a previous glass substrate 1 and the previous spacer 6.

With this structure, each of the glass substrates 1 and the spacers 6 can be successively and alternately piled up on the stage without detecting or adjusting the heights of each of the first and the second robot hands 116 and 117 each time when each of the glass substrates 1 and the spacers 6 is located. Accordingly, this structure serves to simplify the machine. When each thickness of the glass substrates 1 is identical with that of the spacers 6, the stage can be desirably moved at the same pitch downwards.

When the glass substrates 1 and the spacers 6 are all set on the stage 110, the first and the second robot hands 116 and 117 are retracted from the stage 110. Thereafter, the second grinding jig 117 is moved downwards onto the stack of the glass substrates 1 and the spacers 6. In this event, the rotatable brush 4 (shown in FIG. 2) is arranged or set within the center holes of the glass substrates 1 and the spacers 6 to grind the inner side end surfaces of the glass substrates 1 in the manner mentioned in conjunction with FIG. 2.

As mentioned above, although the description has thus far been made about the preferred embodiments mentioned above, this invention may not be restricted to them. The glass substrates and the magnetic layers may not always restricted to those mentioned in conjunction with the embodiments. For example, the glass materials of the glass substrate 1 may be, for example, aluminosilicate glass, soda lime glass, soda aluminosilicate glass, aluminoborosilicate glass, borosilicate glass, quartz glass, chain silicate glass, glass ceramics, such as crystalline glass, ceramics, or the like. Specifically, the aluminosilicate glass may comprises, by weight $SiO_2$:62 to 75%, $Al_2O_3$:5 to 15%, $LiO_2$:4 to 10%, $Na_2O$:4 to 12%, and $ZrO_2$:5.5 to 15%. A weight ratio of $Na_2O/ZrO_2$ falls within a range between 0.5 and 2.0 while a weight ratio of $Al_2O_3/ZrO_2$ falls within a range between 0.4 and 2.5%. Preferably, the aluminosilicate glass is subjected to chemical reinforcement.

Furthermore, $ZrO_2$ might give rise to undesirable projections which appear on main surfaces of each substrate when $ZrO_2$ is left unmolten. In order to remove such projections, it is possible to use chemical reinforcement glass or the like which comprises, by mol %, 57 to 74% of $SiO_2$, 0 to 2.8% of $ZrO_2$, 3 to 15% of $Al_2O_3$, 7 to 16% of $LiO_2$, and 4 to 14% of $Na_2O$. At any rate, the aluminosilicate glass mentioned above can be increased in transverse rupture strength and Knoop hardness because a compressive stress layer is formed in a deep position, when it is subjected to chemical reinforcement.

As the magnetic layer, exemplified are magnetic thin films of CoPt, CoCr, CoNi, CoNiCr, CoCrTa, CoPtCr, CoNiPt, CoNiCrPt, CoNiCtTa, CoCrTaPt, CoCrPtB, CoCrPtSiO, and the like. The magnetic layer may be formed by a multilayer structure, CoPtCr/CrMo/CoPtCr or CoCrTaPt/CrMo/CoCrTaPt, which divides a magnetic layer by a nonmagnetic layer so as to reduce noise.

The magnetic layer which is used for the magneto-resistive (MR) head or the giant magneto-resistive (GMR) head may be formed, for example, by a mixture of a Co-system alloy with impurity elements or their oxides, which are selected from a group consisting of Y, Si, rare earth elements, Hf, Ge, Sn, and Zn.

In addition, the magnetic layer may have a granular structure has a nonmagnetic layer which is composed of ferrite system materials, iron-rare earth system materials, $SiO_2$, or BN and in which magnetic grains are dispersed. The magnetic layer may be either of an in-plane type or a vertical type.

Each of the magnetic recording medium glass substrate according to this invention can be used for a glass substrate of a magneto-optical disk, an electro-optical disk, such as an optical disk, or the like.

Moreover, the grinding method and the grinding apparatus according to this invention are available for a crystal substance (such as a single crystal substrate), a brittleness substance, such as ceramic materials, metal materials, and so on.

Figure 9A:
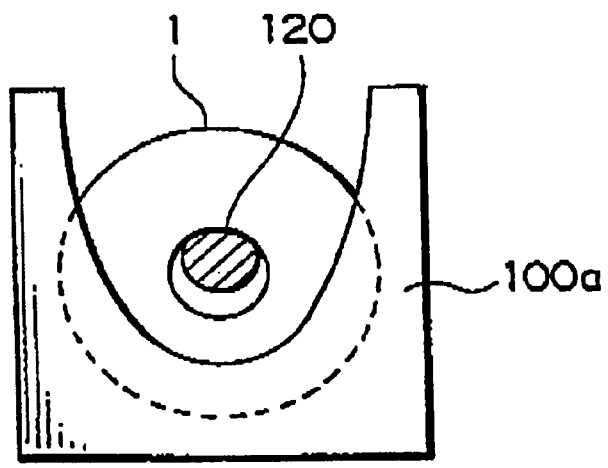
FIGS. 9A, 9B, and 9C show views for use in describing a method according to another embodiment of this invention.
Figure 9B:
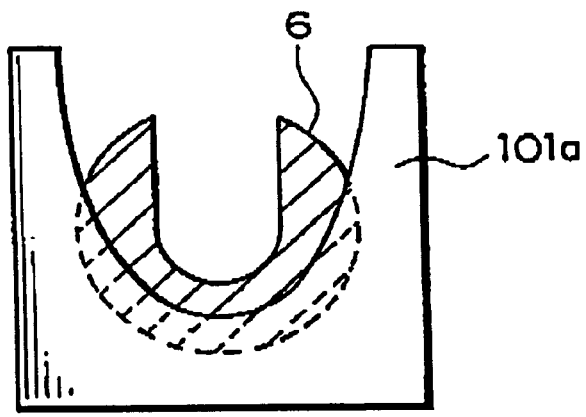
Figure 9C:
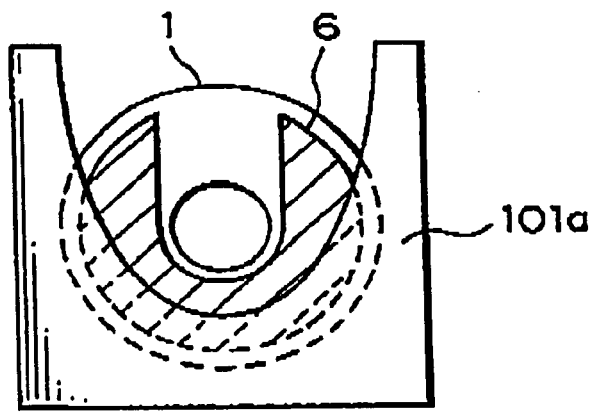

Furthermore, the method of interposing each spacer between glass substrates may not be restricted to the above-mentioned method. For example, the spacers may be manually interposed between the glass substrates to form a stack of glass substrate/spacer/glass substrate. Alternatively, disk and spacer cases 100a and 101a may be prepared to accommodate the glass substrates and the spacers, respectively, as illustrated in FIGS. 9A and 9B. Herein, the disk case 100a can accommodate a plurality of glass substrates with a predetermined spacing left between two adjacent ones of the glass substrates. Each predetermined spacing is kept by a spacing unit which has a V-shaped recess and a thickness equal to each glass substrate. A transportation bar 120 is inserted into center holes of the glass substrates, as illustrated in FIG. 9A and transports all of the glass substrates from the disk case 100a to the spacer case 101, as shown in FIG. 9B. Thereafter, the glass substrates are interposed between the spacers 6 within the spacer case 101a, as illustrated in FIG. 9C. Thus, the glass substrates 1 and the spacers 6 are alternately arranged in the order of glass substrate/spacer/glass substrate.

In the above-mentioned embodiment shown in FIGS. 9A–9C, it is assumed that the spacers 6 are less in number than the glass substrates 1. However, the number of the spacers 6 may be greater than that of the glass substrates 1. In this event, it is possible to prevent the glass substrate from being directly contacted with the grinding jig.

According to the grinding method of this invention, the glass substrates can not be broken even when they are extremely thin in thickness. In addition, the side end surfaces of each glass substrate ground by the side end surface grinding method according to this invention can not be roughened during the subsequent processes carried out after the side end surface grinding process. Besides, no unground remnant portions appear on the chamfered portions of the side end surface. Therefore, the inner and the outer side end surfaces of the glass substrates and the like can be highly smoothed at a low cost and are kept highly clean. Thus, the resultant glass substrates serve to manufacture the magnetic recording medium glass substrates and serve to form magnetic recording media that can extremely suppress any troubles resulting from foreign materials appearing on the main surfaces of the magnetic recording media.

What is claimed is:

1. A method of grinding each side end surface of a plurality of substrates of disk shape, comprising the steps of:

preparing chamfered substrates each of which has chamfered portions along at least one side end surface;

successively stacking the chamfered substrates with an intermediary interposed between two adjacent ones of the chamfered substrates; and grinding each side end surface with the intermediary interposed between the chamfered substrates.

2. A method as claimed in claim 1, wherein the intermediary is formed by a spacer.

3. A method as claimed in claim 2, wherein the grinding step is executed by the use of a rotatable brush or a rotatable pad within a grinding solution including abrasive grains.

4. A method of processing a plurality of chamfered substrates of disk shape, each of which has a pair of main surfaces, inner and outer side end surfaces, and chamfered portions contiguous to the main surfaces and the inner and the other side end surfaces, comprising the steps of:

successively stacking the chamfered substrates with an intermediary interposed between two adjacent ones of the chamfered substrates; and grinding at least one of the inner and the outer side end surfaces with the intermediary interposed between the chamfered substrates.

5. A method as claimed in claim 4, wherein the intermediary is formed by a spacer.

6. A method as claimed in claim 5, further comprising the steps of:

lapping each main surface of the substrates; and polishing each main surface of the substrates.

7. A method as claimed in claim 6, wherein the grinding step is performed after the lapping step and before the polishing step.

8. A method as claimed in claim 5, wherein the grinding step is carried out by the use of a grinding brush or a grinding pad.

9. A method as claimed in claim 8, wherein the spacer is formed by a soft material such that breakage of each substrate is not caused to occur due to a pressure resulting from the grinding brush or the grinding pad.

10. A method as claimed in claim 5, wherein the grinding step comprises the steps of:

grinding the inner side end surface of each substrate; and grinding the outer side end surface of each substrate.

11. A method as claimed in claim 10, wherein either one of the inner and the outer side end surfaces is performed prior to the other.

12. A method as claimed in claim 10, wherein the inner and the outer side end surfaces are performed simultaneously.

13. A method as claimed in claim 10, wherein the inner side end surface grinding step is performed at a pressure which is imposed by a grinding brush or a grinding pad onto the inner side end surface of each substrate and which is less than a pressure imposed during the outer side end surface grinding step.

14. A method as claimed in claim 10, wherein the inner side end surface grinding step is performed by a grinding brush which has bristles having diameters smaller than those of bristles of a grinding brush used in the outer side end surface grinding step.

15. A method of manufacturing a magnetic recording medium, comprising the steps of:

preparing a plurality of chamfered glass substrates;

successively stacking the chamfered glass substrates with an intermediary interposed between two adjacent ones of the chamfered glass substrates; and grinding each side end surface of the chamfered glass substrates with the intermediary interposed between the chamfered glass substrates.

16. A method as claimed in claim 14, the glass substrate having a disk shape, a pair of main surfaces opposite to each other, an inner side end surface which defines a center hole of the glass substrate and which is contiguous to the main surfaces, an outer side end surface opposite to the inner side end surface and contiguous to the main surfaces, further comprising the step of:

depositing a magnetic layer over at least one of the main surfaces after the side end surface grinding step.

17. A method as claimed in claim 16, wherein the magnetic layer comprises Co and Pt.

18. A method as claimed in claim 16, wherein the magnetic recording medium is used for either a magneto-resistive (MR) head or a giant magneto-resistive (GMR).

* * * * *

UNITED STATES PATENT AND TRADEMARK OFFICE
CERTIFICATE OF CORRECTION

| | | |
|---|---|---|
| PATENT NO. | : 6,615,613 B1 | Page 1 of 1 |
| APPLICATION NO. | : 09/676669 | |
| DATED | : September 9, 2003 | |
| INVENTOR(S) | : Shozo Iwabuchi and Masahiro Katagiri | |

It is certified that error appears in the above-identified patent and that said Letters Patent is hereby corrected as shown below:

In item (*) Notice, please change "Subject to any disclaimer, the term of this patent is extended or adjusted under 35 U.S.C. 154(b) by 0 days" to -- Subject to any disclaimer, the term of this patent is extended or adjusted under 35 U.S.C. 154(b) by 56 days--.

Signed and Sealed this

Seventeenth Day of October, 2006

JON W. DUDAS
*Director of the United States Patent and Trademark Office*